United States Patent
Thomas et al.

(10) Patent No.: US 12,535,027 B2
(45) Date of Patent: Jan. 27, 2026

(54) VEHICLE EXHAUST SYSTEM HAVING AN INTEGRAL HOOD

(71) Applicant: TENNECO AUTOMOTIVE OPERATING COMPANY LLC, Northville, MI (US)

(72) Inventors: Stephen Thomas, Laingsburg, MI (US); Gabriel Ostromecki, Ann Arbor, MI (US); Asela Anuruddhika Benthara-Wadumesthrige, Ann Arbor, MI (US); Frederick M. Baumgartner, Jackson, MI (US); David Alan Stephens, Hastings, MI (US); Marcel Womann, Rhineland-Palatinate (DE)

(73) Assignee: Tenneco Automotive Operating Company LLC, Northville, MI (US)

( * ) Notice: Subject to any disclaimer, the term of this patent is extended or adjusted under 35 U.S.C. 154(b) by 0 days.

(21) Appl. No.: 18/394,759

(22) Filed: Dec. 22, 2023

(65) Prior Publication Data
US 2024/0218822 A1 Jul. 4, 2024

Related U.S. Application Data

(60) Provisional application No. 63/435,685, filed on Dec. 28, 2022.

(51) Int. Cl.
*F01N 13/18* (2010.01)
*F16L 25/10* (2006.01)

(52) U.S. Cl.
CPC .......... *F01N 13/1805* (2013.01); *F16L 25/10* (2013.01)

(58) Field of Classification Search
CPC ....... F01N 13/1805; F16L 25/10; F16L 27/12; F16L 27/125
See application file for complete search history.

(56) References Cited

U.S. PATENT DOCUMENTS

| 1,707,312 | A | * | 4/1929 | McDaniel | F16L 27/12 |
| 2,323,891 | A | | 7/1943 | Blanchard | |
| 3,232,374 | A | | 2/1966 | Powers | |
| 3,656,784 | A | * | 4/1972 | Dow | F16L 27/12 |
| 4,315,644 | A | | 2/1982 | Jansing | |
| 4,875,716 | A | * | 10/1989 | Winzen | F01N 13/1811 |

(Continued)

FOREIGN PATENT DOCUMENTS

| CN | 104074585 A | 10/2014 |
| CN | 210509347 U | 5/2020 |

(Continued)

OTHER PUBLICATIONS

Machine translation of DE112015005030T5, accessed Mar.8, 2023 (Year:2023).

(Continued)

*Primary Examiner* — Zachary T Dragicevich
(74) *Attorney, Agent, or Firm* — McGarry Bair PC

(57) ABSTRACT

A vehicle exhaust system having a first pipe, a second pipe, and an integral hood. The first pipe extending between a first end and a second end. The second pipe extending between a third end and a fourth end. At least a portion of the first pipe being positioned within the second pipe such that the second end is provided downstream of the third end. The integral hood is formed between the second end and the third end.

19 Claims, 9 Drawing Sheets

(56) References Cited

U.S. PATENT DOCUMENTS

| | | |
|---|---|---|
| 5,493,080 A | 2/1996 | Moss |
| 6,378,471 B1 | 4/2002 | Yamada et al. |
| 7,556,123 B2 | 7/2009 | Ido et al. |
| 7,918,310 B1 | 4/2011 | Helgeson et al. |
| 8,341,953 B2 | 1/2013 | Murakami et al. |
| 8,439,156 B1 | 5/2013 | Abram |
| 8,881,863 B2 | 11/2014 | Abram et al. |
| 10,787,943 B2 | 9/2020 | Kishikawa et al. |
| 2004/0104071 A1 | 6/2004 | Wahlstrom et al. |
| 2007/0125594 A1 | 6/2007 | Hill |
| 2008/0017444 A1 | 1/2008 | Dowdy |
| 2008/0041657 A1 | 2/2008 | Ido et al. |
| 2008/0230306 A1 | 9/2008 | Ichikawa |
| 2017/0022874 A1* | 1/2017 | Laursen ............... F01N 13/1805 |
| 2018/0347440 A1 | 12/2018 | Shimizu et al. |
| 2019/0186332 A1 | 6/2019 | Scanlon |
| 2020/0088078 A1 | 3/2020 | Zuver et al. |
| 2020/0392887 A1* | 12/2020 | Golin ................ F01N 13/1838 |
| 2021/0108544 A1 | 4/2021 | Boennen et al. |
| 2021/0285349 A1 | 9/2021 | Ostromecki et al. |
| 2022/0018276 A1* | 1/2022 | Golin .................... F01N 13/141 |

FOREIGN PATENT DOCUMENTS

| | | |
|---|---|---|
| DE | 1115005030 T5 | 8/2017 |
| EP | 0068368 A1 | 1/1983 |
| EP | 3059407 A1 | 8/2016 |
| JP | 2004169622 A | 6/2004 |
| JP | 4771546 B2 | 9/2011 |
| JP | 2012225210 A | 11/2012 |
| JP | 2015222056 A | 12/2015 |

OTHER PUBLICATIONS

Notification of Transmittal of the International Search Report and the Written Opinion of the International Searching Authority for Counterpart PCT/US2022/026948, dated Aug. 8, 2022, 11 Pages.

* cited by examiner

VEHICLE EXHAUST SYSTEM HAVING AN INTEGRAL HOOD

CROSS-REFERENCE TO RELATED APPLICATIONS

This application claims priority to and the benefit of U.S. Provisional Patent Application No. 63/435,685, filed Dec. 28, 2022, which is incorporated herein by reference in its entirety.

TECHNICAL FIELD

The disclosure generally relates to a vehicle exhaust system, and more specifically to a hood formed along the vehicle exhaust system.

BACKGROUND

A vehicle exhaust system directs emissions generated by an internal combustion engine to external environment. The exhaust system may include various components, such as pipes, converters, catalysts, filters, and the like. During operation of the exhaust system, as a result of resonating frequencies, the components may generate undesirable noise. Different methods have been employed in various applications to address this issue.

One such method to reduce the undesirable noise is to provide a series of openings along the pipe of the vehicle exhaust system that provide additional acoustic leak, which breaks pipe standing waves thereby reducing the undesirable noise. In some implementations, a hood is coupled over the opening (e.g., via welding, adhesion, fastening, etc.) to define a reservoir for the fluid exiting the opening. The hood acts as a volume device that ensures that little to no fluid exiting the opening is exhausted to atmosphere surrounding the vehicle exhaust system.

BRIEF DESCRIPTION

In one aspect, the disclosure relates to a vehicle exhaust system comprising a first pipe having a first wall defining a first fluid passage, the first pipe extending between a first end and a second end along a first centerline, the first pipe having a first cross-sectional area, a second pipe having a second wall defining a second fluid passage, the second pipe extending between a third end and a fourth end along a second centerline, and the second pipe having a second cross-sectional area with a first area at the third end and a second area, smaller than the first area, downstream the first area, and a first step defining a transition between the first area and the second area, and an integral hood formed between the second end and the third end, the integral hood defined by at least one radial space between the first pipe and the second pipe, with respect to the second centerline, wherein at least a portion of the first pipe is positioned within the second pipe such that the third end is provided axially forward of the second end, with respect to the first centerline, and the second end confronts and is spaced from a respective portion of the first step to define a gap therebetween that is fluidly coupled to the integral hood.

In another aspect, the disclosure relates to a vehicle exhaust system comprising a first pipe having a first wall defining a first fluid passage, the first pipe extending between a first end and a second end along a first centerline, the first pipe having a first cross-sectional area, a second pipe having a second wall defining a second fluid passage, the second pipe extending between a third end and a fourth end along a second centerline, and the second pipe having a second cross-sectional area with a first area at the third end and a second area, smaller than the first area, downstream the first area, and a first step defining a transition between the first area and the second area, and an integral hood formed between the second end and the third end, the integral hood defined by at least one radial space between the first pipe and the second pipe, with respect to the second centerline, with an inlet to the integral hood being formed along a portion of the first pipe confronting the integral hood, the inlet and the integral hood defining a secondary emissions passage of the vehicle exhaust system, wherein at least a portion of the first pipe is positioned within the second pipe such that the third end is provided axially forward of the second end, with respect to the first centerline, and the second end is spaced axially aft of the first step.

In another aspect, the disclosure relates to a vehicle exhaust system comprising a first pipe having a first wall defining a first fluid passage, the first pipe extending between a first end and a second end along a first centerline, the first pipe having at least one first dimple formed along the first wall and extending radially outward, with respect to the first centerline, from the first wall, a second pipe having a second wall defining a second fluid passage, the second pipe extending between a third end and a fourth end along a second centerline, the second pipe having at least one second dimple formed along the second wall and extending radially inward, with respect to the second centerline, from the second wall, and an integral hood formed between the second end and the third end, the integral hood defined by at least one radial space between the first pipe and the second pipe, with respect to the second centerline, wherein at least a portion of the first pipe is positioned within the second pipe such that the at least one first dimple is provided axially aft of the at least one second dimple, with respect to the second centerline

BRIEF DESCRIPTION OF THE DRAWINGS

A full and enabling disclosure of the present description, including the best mode thereof, directed to one of ordinary skill in the art, is set forth in the specification, which refers to the appended FIGS., in which.

DETAILED DESCRIPTION

Figure 1:
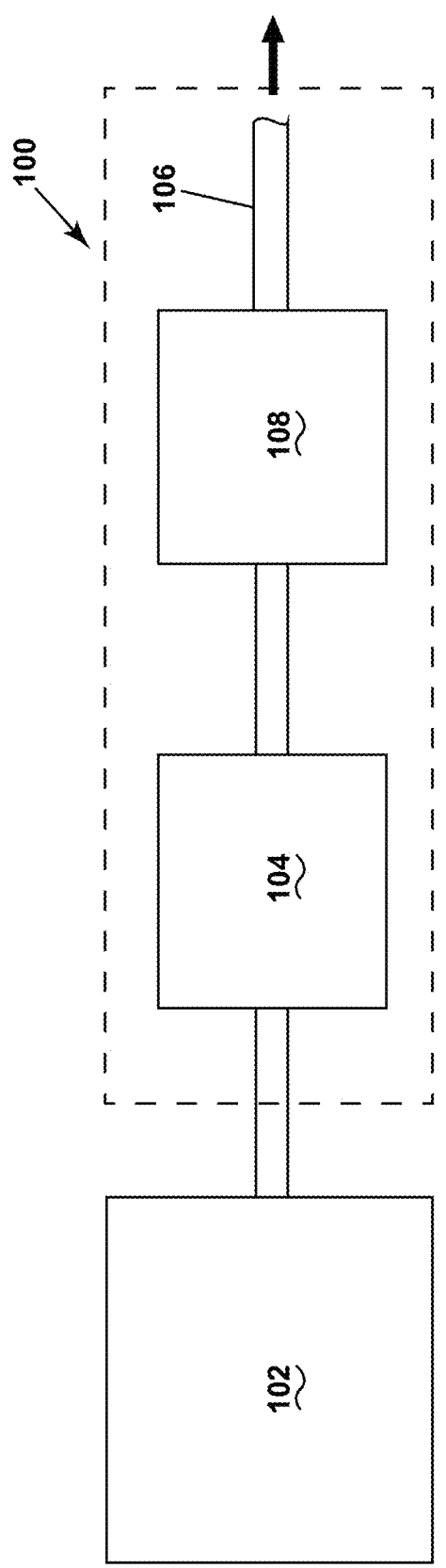
FIG. 1 is a schematic representation of a vehicle exhaust system.

Aspects of this disclosure described herein are directed towards a vehicle exhaust system having a first pipe defining a first fluid passage and a second pipe defining a second fluid passage. The first pipe being at least partially located within the second fluid passage. An integral hood is defined by a space between at least a portion of the first pipe and the second pipe and is integrally formed with at least one of the first pipe or the second pipe. The vehicle exhaust system can be utilized within any suitable environment. As a non-limiting example, the vehicle exhaust system can be utilized within a vehicle (e.g., an automobile with an engine). It will be understood, however, that aspects of the disclosure described herein are not so limited and can have general applicability within other assemblies including a vehicle exhaust system. For example, the disclosure can have applicability for vehicle exhaust systems in other applications or vehicles, and can be used to provide benefits in industrial, commercial, and residential applications.

As used herein, the term "upstream" refers to a direction that is opposite the fluid flow direction, and the term "downstream" refers to a direction that is in the same direction as the fluid flow. Furthermore, as used herein, the term "set" or a "set of elements" can be any number of elements, including only one.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, secured, fastened, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

FIG. 1 is a schematic representation of a vehicle exhaust system 100. The vehicle exhaust system 100 is fluidly coupled to an engine 102. The engine 102 may be any internal combustion engine powered by a fuel, such as diesel, gasoline, natural gas, and/or a combination thereof. Accordingly, the vehicle exhaust system 100 receives emissions generated by the engine 102.

The vehicle exhaust system 100 includes a number of downstream exhaust components 104 fluidly coupled to the engine 102. The exhaust components 104 may include a number of systems/components (not shown), such as a Diesel Oxidation Catalyst (DOC), a Diesel Exhaust Fluid (DEF) unit, a Selective Catalytic Reduction (SCR) unit, a particulate filter, an exhaust pipe, and the like. The exhaust components 104 may be mounted in various different configurations and combinations based on application requirements and/or available packaging space. The exhaust components 104 are adapted to receive the emissions from the engine 102 and direct the emissions to the external atmosphere via a tailpipe 106. The exhaust components 104 are adapted to reduce emissions and control noise.

The vehicle exhaust system 100 also includes an acoustic damping member, such as a muffler 108. The muffler 108 is provided in fluid communication with the exhaust components 104 and the tailpipe 106. In the illustrated embodiment, the muffler 108 is disposed downstream of the exhaust components 104 and upstream of the tailpipe 106. In other embodiments, the muffler 108 may be disposed in any sequence with respect to each of the exhaust components 104 and/or the tailpipe 106, based on application requirements. The muffler 108 is adapted to dampen resonance frequencies generated during operation of the engine 102 and the vehicle exhaust system 100.

Figure 2:
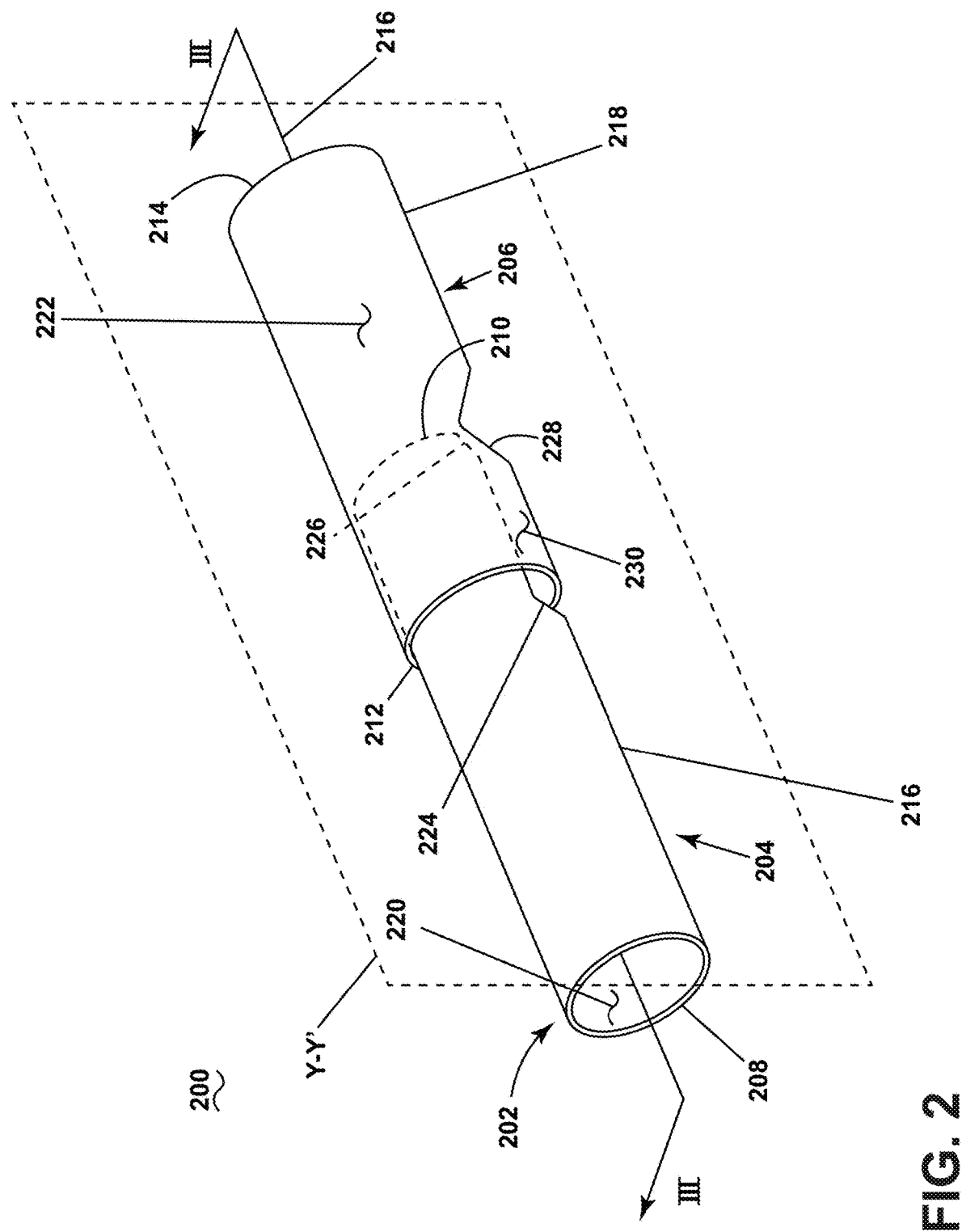
FIG. 2 is a schematic perspective view of a portion of a vehicle exhaust system suitable for use within the vehicle exhaust system of FIG. 1, the vehicle exhaust system including a first pipe, a second pipe and an integral hood.

FIG. 2 is a schematic, perspective view of a portion of a vehicle exhaust system 200 suitable for use within the vehicle exhaust system 100. As described herein, the vehicle exhaust system 200 is understood to be a portion of a full vehicle exhaust system that can include other components such as, but not limited to, upstream or downstream exhaust components (e.g., the downstream exhaust components 104), an acoustic damping member (e.g., the muffler 108) or any other suitable component. Alternatively, the vehicle exhaust system 200 as illustrated can be the full vehicle exhaust system.

The vehicle exhaust system 100 includes a first pipe 204 and a second pipe 206. The first pipe 204 includes a first wall 216 defining a first fluid passage 220. The first pipe 204 extends between a first end 208 and a second end 210, each defining distal ends of the first fluid passage 220. The second pipe 206 includes a second wall 218 defining a second fluid passage 222. The second pipe 206 extends between a third end 212 and a fourth end 214, each defining distal ends of the second fluid passage 222.

The first pipe 204 is defined by a first cross-sectional area when viewed along a vertical plane (Y-Y'). The first cross-sectional area can include at least one reduction or change in area or size from the first end 208 to the second end 210. As a non-limiting example, the first pipe 204 can include a first step 224 and a second step 226, each defining a respective decrease in the first cross-sectional area from an upstream portion to a downstream portion of the first pipe 204, with the downstream portion being axially nearer, with respect to the first centerline, the second end 210 than the upstream portion. A step, as used herein, defines a portion of the first pipe 204 or the second pipe 206 in which the cross-sectional area of the first pipe 204 or the second pipe 206 changes from an upstream portion to a downstream portion of the first pipe 204 and the second pipe 206, respectively. The first step 224, the second step 226 and any other suitable reduction in the first cross-sectional area can be provided along any suitable axial portion of the first pipe 204. As a non-limiting example, the first step is provided axially between the first end 208 and the second end 210. As a non-limiting example, the second step is provided downstream the first end 208 and terminates at the second end 210.

The second pipe 206 is defined by a second cross-sectional area when viewed along the vertical plane (Y-Y'). The second cross-sectional area can include at least one reduction or change in area or size from the third end 212 and to the fourth end 214. As a non-limiting example, the second pipe 206 includes a third step 228 defining a reduction in the second cross-sectional area and then a subsequent expansion of the second cross-sectional area. In other words, the third step 228 forms a constriction or a venturi within the second pipe 206.

Each reduction in the cross-sectional area of the first pipe 204 or the second pipe 206 through the first step 224, the second step 226, the third step 228 or any other step defines a transition between a first area and a second area, smaller than the first area. In the case of the third step 228, the third step 228 defines a transition from a first area to a second area, smaller than the first area, and ultimately to a third area that is larger than the second area.

The first pipe 204 upstream of the first step 224 (e.g., from the first step 224 and towards the first end 208) can have an equal or non-equal cross-sectional area of the second pipe 206 downstream of the third step 228 (e.g., from the third step 228 and towards the fourth end 214).

The inclusion of at least one of the first step 224 and the second pipe 206 of first pipe 204 allows a portion of the first pipe 204 between the first step 224 and the second end 210 to be inserted into the second pipe 206 (e.g., into the second fluid passage 222). In other words, the first pipe 204 is inserted into the second pipe 206 such that the second end 210 is located downstream of or aft of the third end 212. The second step 226 or the second end 210 can confront and be spaced from a portion of the third step 228. As a non-limiting example, the second step 226 or the second end 210 can confront and be spaced from an upstream face of the third step 228.

An integral hood 230 is formed between a portion of the first pipe 204 and the second pipe 206. As a non-limiting example, the reduction in the first cross-sectional are of the first pipe 204 ensures that a space is created between the first pipe 204 and the second pipe 206 when the first pipe 204 is inserted into the second pipe 206. This space defines the integral hood 230. As illustrated, the integral hood 230 terminates at the third end 212. It will be appreciated that the integral hood 230 can be open to atmosphere at the third end 212. Alternatively, a wall (not illustrated) can extend over the third end 212 such that the integral hood 230 is closed off at the third end 212.

Figure 3:
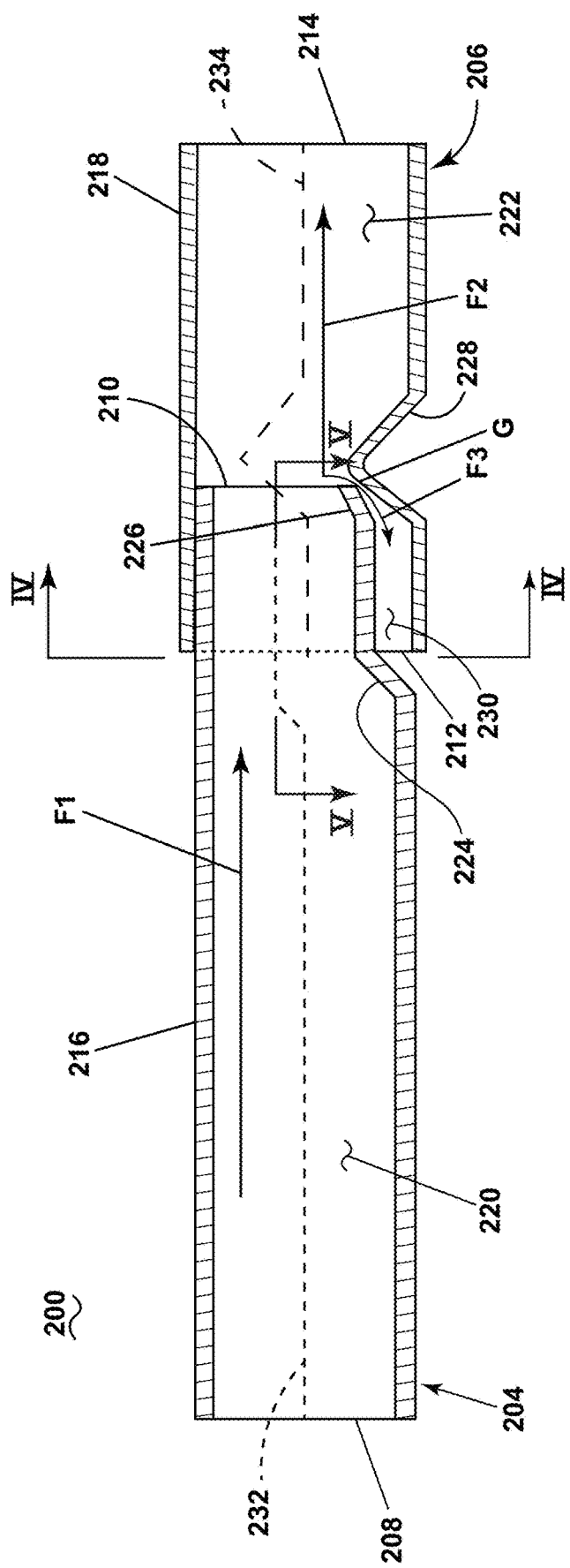
FIG. 3 is a schematic cross-sectional side view of the vehicle exhaust system as seen from sectional line III-III of FIG. 2, further illustrating a first fluid passage and a second fluid passage.

FIG. 3 is a schematic cross-sectional side view of the vehicle exhaust system of FIG. 2 as seen from sectional line III-III of FIG. 3. The first pipe 204 extends along a first centerline 232 defined as a line that is equidistant from opposing portions of the first wall 216 between the first end 208 and the second end 210. The second pipe 206 extends along a second centerline 234 defined as a line that is equidistant from opposing portions of the second wall 218 between the third end 212 and the fourth end 214.

The first centerline 232 and the second centerline 234 can follow a non-constant (e.g., non-linear) path or otherwise be formed as a continuous straight (e.g., linear) path. The first centerline 232 and the second centerline 234 can the expansion(s) and reduction(s) of the cross-sectional area of the first pipe 204 and the second pipe 206, respectively. The first centerline 232 can be parallel to or non-parallel to, or aligned with or non-aligned with the second centerline 234 along any portion of the first pipe 204. As a non-limiting example, the first centerline 232 can be non-aligned with, but parallel with the second centerline 234 at the third end 212.

When assembly, a portion of the first pipe 204 near the third step 228 (e.g., the second step 226) is spaced from the third step 228 to define a gap (G) therebetween. The gap (G) can be continuously formed along the integral hood 230 and define an inlet to the integral hood 230. The gap (G) defines an opening to the integral hood 230 such that the gap (G) and the integral hood 230, together, define a secondary emissions passage.

Figure 4:
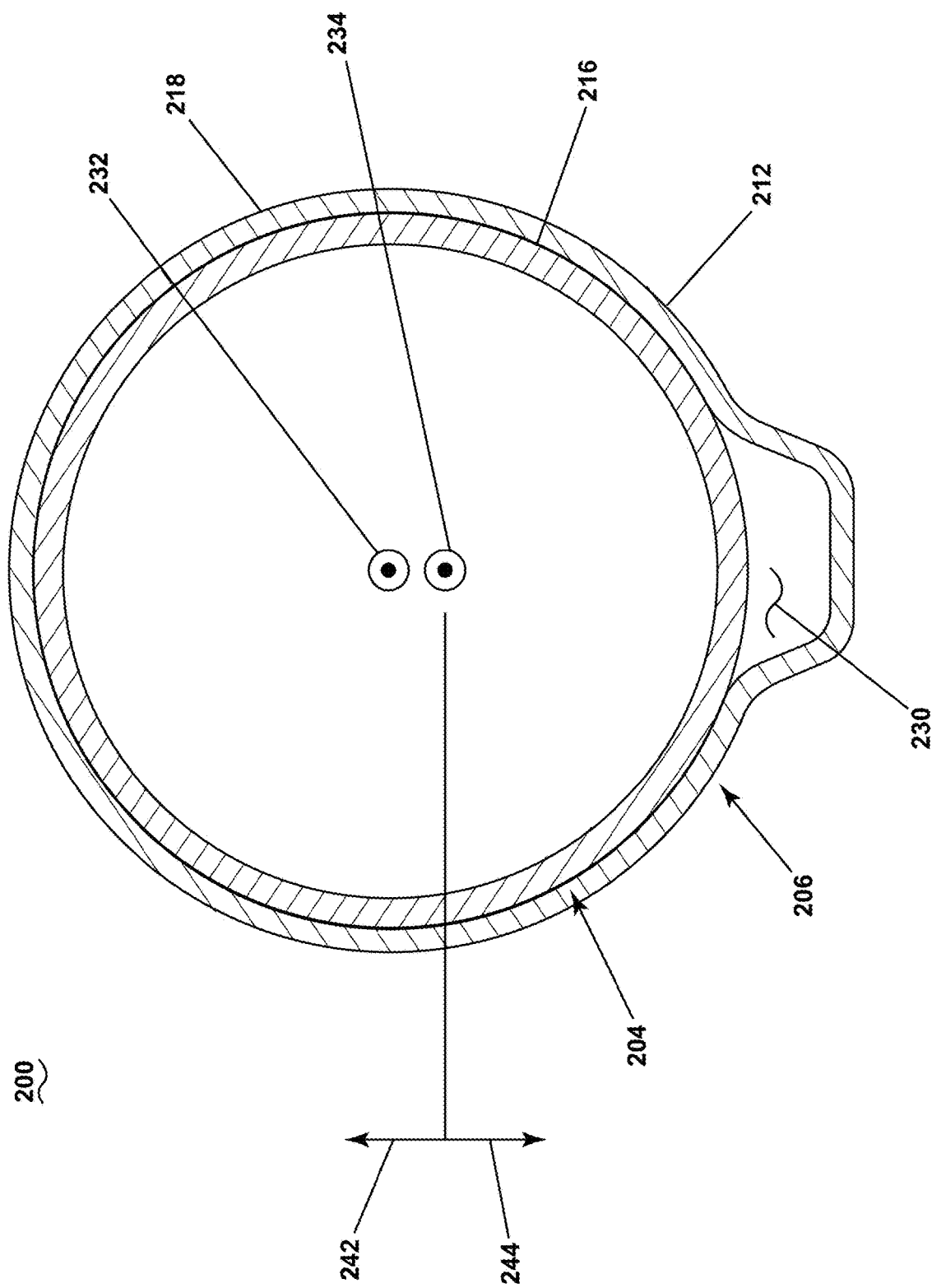
FIG. 4 is a schematic transverse, cross-sectional view of the vehicle exhaust system as seen from sectional line IV-IV of FIG. 3, further illustrating the integral hood.

FIG. 4 is a schematic transverse cross-sectional view of the vehicle exhaust system 200 as seen from sectional line IV-IV of FIG. 3. The vehicle exhaust system 200 can be further split into a first radial half 242 and a second radial half 244, with respect to the second centerline 234. The first radial half 242 and the second radial half 244 can further be defined by gravity. As a non-limiting example, the first radial half 242 can be a gravitationally upper half while the second radial half 244 can be a gravitationally lower half.

The first wall 216 can contact the second wall 218 within a portion of the first radial half 242. The first wall 216 can be coupled to (e.g., via welding, adhesion, fastening, etc.) or held in frictional contact with the second wall 218.

At least a portion of the second pipe 206, as illustrated, is non-circular. As a non-liming example, a portion of the second pipe 206 can diverge from the first pipe 204 to define a space between the first pipe 204 and the second pipe 206. This space defines the integral hood 230.

The integral hood 230 extends circumferentially about a portion of the second centerline 234. The integral hood 230 can extend continuously, as illustrated, or non-continuously in a segmented fashion. The integral hood 230 can be provided entirely within a single one of the first radial half 242 or the second radial half 244. Alternatively, the integral hood 230 can extend between the first radial half 242 and the second radial half 244. The integral hood 230 can extend about any suitable portion of the second centerline 234.

The vehicle exhaust system 200 can be manufactured without having to weld or otherwise couple the integral hood 230 to a respective portion of the vehicle exhaust system 200. This is because the integral hood 230 is integrally formed within the vehicle exhaust system 200 once the first pipe 204 is inserted into the second pipe 206.

Figure 5:
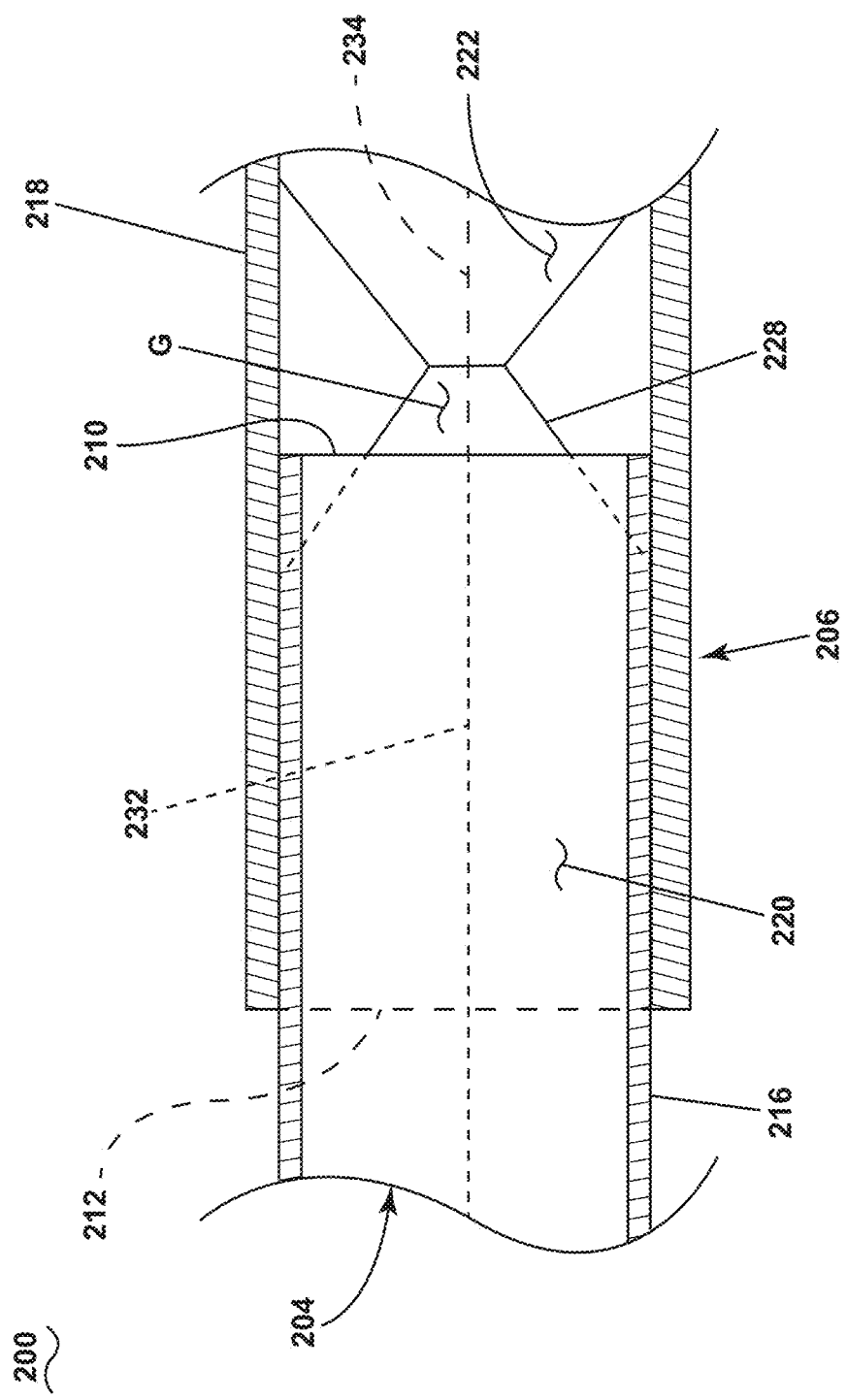
FIG. 5 is a schematic cross-sectional top view of the vehicle exhaust system as seen from sectional line V-V of FIG. 3, further illustrating a gap forming an opening into the integral hood.

FIG. 5 is a schematic cross-sectional top view of the vehicle exhaust system 200 as seen from sectional line V-V of FIG. 3. As illustrated, the third step 228 converges inwardly from the second wall 218. The third step 228 can converge inwardly axially past the second end 210 such that the gap (G) is formed between a portion of the third step 228 and the second end 210. As illustrated, the gap (G) extends a total radial distance that is less than the radial distance that the second end 210 extends. It will be appreciated, however, that the gap (G) can extend across any suitable portion of the second end 210.

With reference to FIGS. 3-6, during operation, a first emissions (F1) is fed to the first fluid passage 220 through the first end 208. The first emissions (F1) flows into the second fluid passage 222 through the second end 210 to define a second emissions (F2). At least a portion of the second emissions (F2) is exhausted through the fourth end 214.

A leakage emissions (F3) will flow into the integral hood 230 through the gap (G) where it remains in the volume defined by the integral hood 230. In other words, the integral hood 230 acts as a reservoir for any leakage emissions between the first pipe 204 and the second pipe 206, thus ensuring leakage emissions are not exhausted to atmosphere.

During normal operation of the engine that the vehicle exhaust system 200 is coupled to (e.g., the engine 102 of FIG. 1), at least a portion of the first emissions (F1) and the second emissions (F2) can switch directions from what is illustrated. This switch in direction, in turn, causes the leakage emissions (F3) already within the volume of the integral hood 230 to be suctioned out of the integral hood 230 and brought back into the first fluid passage 220 or the second fluid passage 222. The suctioning of the leakage emissions (F3) from within the integral hood 230 and into the first fluid passage 220 or the second fluid passage 222 will be referred to herein as the rebound.

It is contemplated that the volume of the integral hood 230 is large enough such that when the rebound occurs, that all of the leakage emissions (F3) within the integral hood 230 are suctioned out of the integral hood 230. In other words, the total amount of leakage emissions (F3) that flows into the integral hood 230 equals or is very near to (e.g., within +/−1% of) the total amount of leakage emissions (F3) that flows out of the integral hood 230 such that a net-zero emissions flow is created between the two scenarios. The generation of the net-zero emissions flow, in turn, reduces the acoustic vibrations or noise attenuation associated with the movement of the leakage emissions flow (F3) when compared to a vehicle exhaust system without the integral hood 230 as described herein.

It is contemplated that an axial or circumferential length of the integral hood 230 can be varied to tune the volume of the integral hood 230. The volume of the integral hood 230 can be selected based on the intended implementation or operation of the vehicle exhaust system 200. As a non-limiting example, in instances where it is anticipated that a larger amount of leakage emissions (F3) will flow into the integral hood 230, the volume can be increased when compared to an instance where a relative low amount of leakage emissions (F3) will flow into the integral hood 230.

Figure 6:
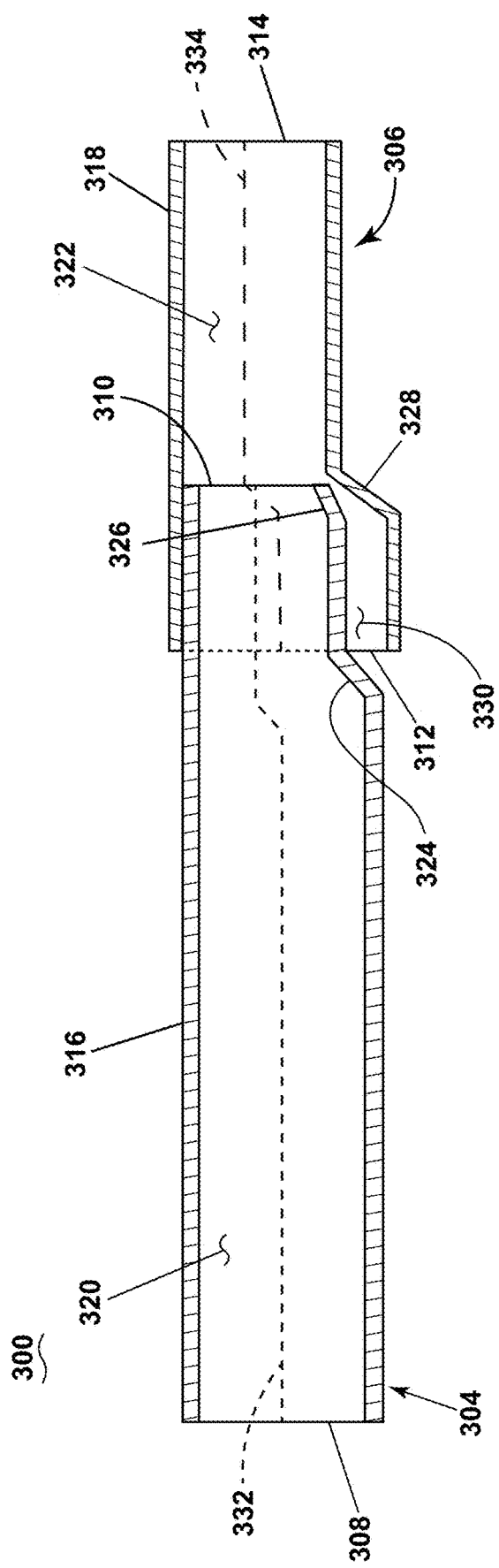
FIG. 6 is a schematic cross-sectional side view of a portion of an exemplary vehicle exhaust system suitable for use within the vehicle exhaust system of FIG. 2, and further including a first step and a second step.

FIG. 6 is a schematic cross-sectional side view of a portion of an exemplary vehicle exhaust system 300 suitable for use as the vehicle exhaust system 200 of FIG. 2. The vehicle exhaust system 300 is similar to the vehicle exhaust system 200; therefore, like parts will be identified by like numerals increased to the 300 series with it being understood that the description of the vehicle exhaust system 200 applies to the vehicle exhaust system 300, unless otherwise noted.

The vehicle exhaust system 300 includes a first pipe 304 and a second pipe 306. The first pipe 304 includes a first wall 316 defining a first fluid passage 320. The first pipe 304 extends along a first centerline 332 between a first end 308 and a second end 310. The first pipe 304 includes a first step 324 and a second step 326. The second pipe 306 includes a second wall 318 defining a second fluid passage 322. The second pipe 306 extends along a second centerline 334 between a third end 312 and a fourth end 314. An integral hood 330 is formed between the first pipe 304 and the second pipe 306.

The vehicle exhaust system 300 is similar to the vehicle exhaust system 200, except that the vehicle exhaust system 300 includes a third step 328 defining a reduction in the second cross-sectional area but not a subsequent expansion of the second cross-sectional area. In other words, the third step 328 is not a constriction like the third step 228 (FIG. 2).

Figure 7:
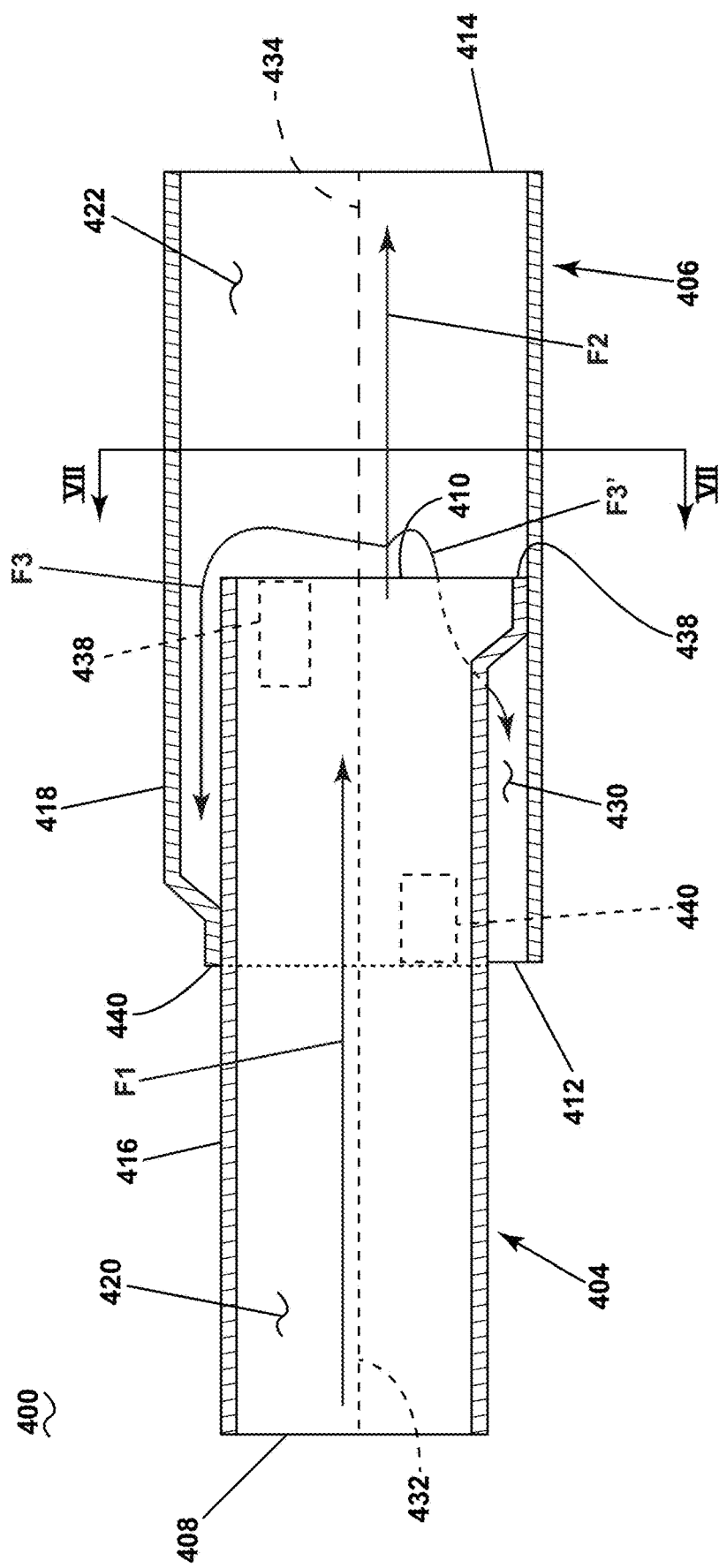
FIG. 7 is a schematic cross-sectional side view of a portion of an exemplary vehicle exhaust system suitable for use within the vehicle exhaust system of FIG. 2, and further including a first dimple and a second dimple.

FIG. 7 is a schematic cross-sectional side view of a portion of an exemplary vehicle exhaust system 400 suitable for use as the vehicle exhaust system 200 of FIG. 2. The vehicle exhaust system 400 is similar to the vehicle exhaust system 200, 300; therefore, like parts will be identified by like numerals increased to the 400 series with it being understood that the description of the vehicle exhaust system 200, 300 applies to the vehicle exhaust system 400, unless otherwise noted.

The vehicle exhaust system 400 includes a first pipe 404 and a second pipe 406. The first pipe 404 includes a first wall 416 defining a first fluid passage 420. The first pipe 404 extends along a first centerline 432 between a first end 408 and a second end 410. The second pipe 406 includes a second wall 418 defining a second fluid passage 422. The second pipe 406 extends along a second centerline 434 between a third end 412 and a fourth end 414. An integral hood 430 is formed between the first pipe 404 and the second pipe 406.

The vehicle exhaust system 400 is similar to the vehicle exhaust system 200, 300, except that the vehicle exhaust system 400 includes a first set of dimples 438 and a second set of dimples 440 formed along the first pipe 404 and the second pipe 406, respectively. The first set of dimples 438 define a portion of the first wall 416 that extends radially outward with respect to the first centerline 432 and contact a respective portion of the second pipe 406. The second set of dimples 440 define a portion of the second wall 418 that extends radially inward with respect to the second centerline 434 and contact a respective portion of the first pipe 404. The first set of dimples 438 and the second set of dimples 440 can be provided along any suitable portion of the first pipe 404 and second pipe 406, respectively. As a non-limiting example, the first set of dimples 440 can define a portion of the second end 410, while the second set of dimples 440 can define a portion of the third end 412.

The integral hood 430 is formed between the first set of dimples 438 and the second set of dimples 440. The first pipe 404 and the second pipe 406 can, as illustrated, include a constant cross-sectional area. As such, the first centerline 432 can be aligned with and parallel to the second centerline 434, as illustrated.

Figure 8:
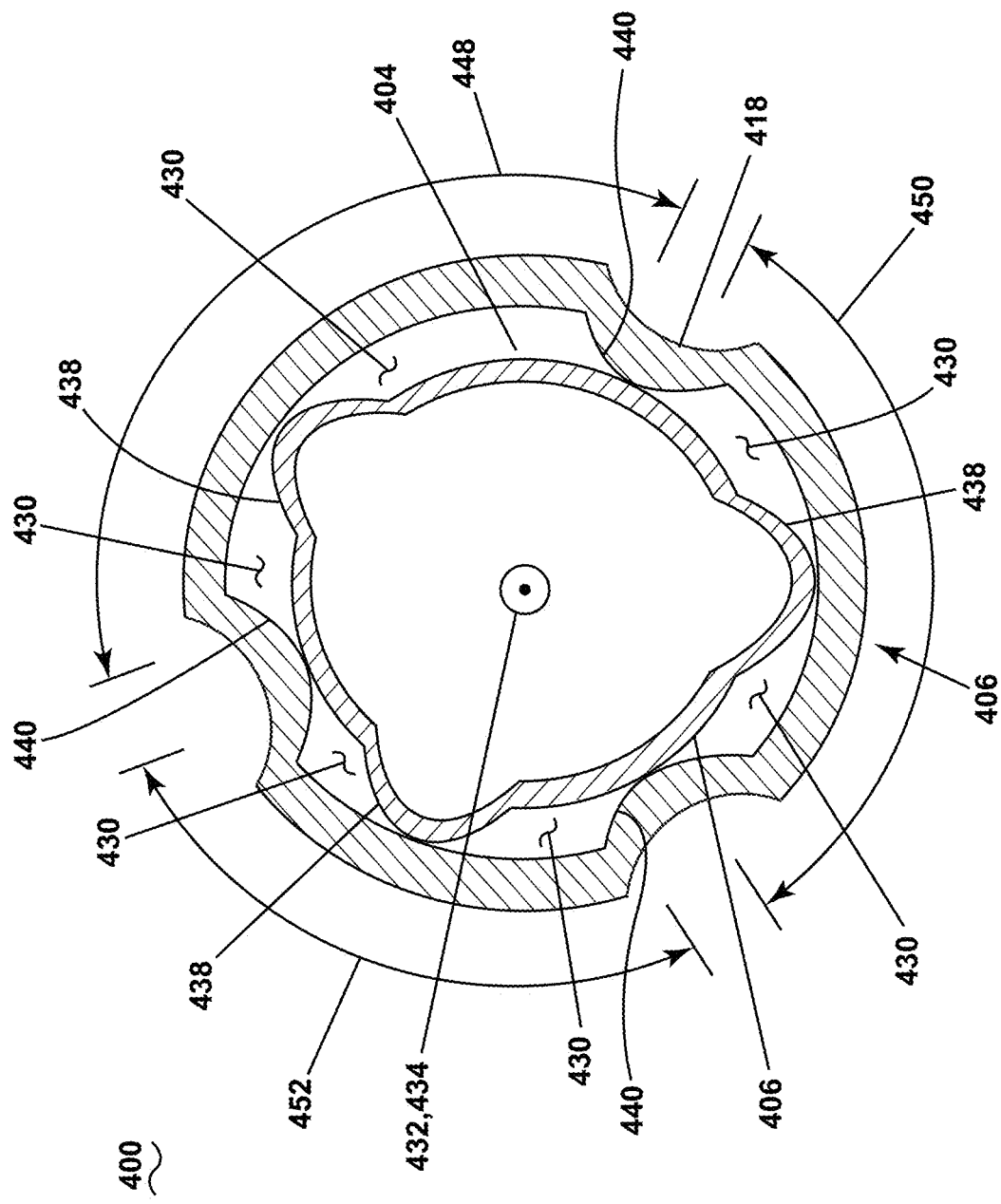
FIG. 8 is a schematic transverse, cross-sectional view of the vehicle exhaust system as seen from sectional line VII-VII of FIG. 6, further illustrating the integral hood split into discrete hood segments.

FIG. 8 is a schematic cross-sectional transverse view of the vehicle exhaust system 400 as seen from sectional line VIII-VIII of FIG. 7. The first set of dimples 438 and the second set of dimples 440 can split the integral hood 430 into a plurality of segments that extend circumferentially about at least a portion of the second centerline 434.

There can be any number of two or more segments defining the integral hood 430. As a non-limiting example, the vehicle exhaust system 400 can include a first segment 448, a second segment 450, and a third segment 452. Each segment of the plurality of segments is defined by a circumferential space between circumferentially adjacent dimples of the second set of dimples 440. Each of the first segment 448, the second segment 450, and the third segment 452 can be further split by a respective one dimple of the first set of dimples 438.

The first set of dimples 438 and the second set of dimples 440 can be evenly or non-evenly spaced circumferentially about the first centerline 432 and the second centerline 434, respectively. Each dimple of the first set of dimples 438 can be provided equidistant from a respective two circumferentially adjacent dimples of the second set of dimples 440. Each segment of the plurality of segments can include an equal or non-equal circumferential extent or length. As a non-limiting example, the first segment 448 can extend circumferentially farther or otherwise have a larger circumferential length than the third segment 452.

The first set of dimples 438 and the second set of dimples 440 can each be formed through any suitable method. As an on-limiting example, the first set of dimples 438 and the second set of dimples 440 can be stamped into the first pipe 404 and the second pipe 406, respectively. When stamped, the first pipe 404 and the second pipe 406 are defined by a constant thickness, as illustrated, and include a non-circular cross section. Alternatively, the first set of dimples 438 and the second set of dimples 440 can be coupled to or otherwise be defined as sections of increased cross-sectional area of the respective first pipe 404 and second pipe 406.

With reference to both FIG. 6 and FIG. 7, during operation of the vehicle exhaust system 400 a first emissions (F1) flows through the first fluid passage 420 and into the second fluid passage 422 as a second emissions (F2). A portion of the second emissions (F2) branches off within the second fluid passage 422 to form a leakage emissions (F3). The leakage emissions (F3) is similar to the leakage emissions (F3) of FIG. 3 in function. The difference, however, is that the vehicle exhaust system 400 includes any number of two or more leakage emissions corresponding to the total number of segments formed by the first set of dimples 438 and the second set of dimples 440. The two or more leakage emissions (F3) meet within the integral hood to form a single leakage emissions (F3) within the integral hood between the first set of dimples 438 and the second set of dimples 440.

It is contemplated that providing the segments that result in the two or more leakage emissions (F3) can be used to further tune the noise attenuation properties of the vehicle exhaust system 400. For example, sizing of the first segment 448, the second segment 450, the third segment 452, or any number of two or more segments can be used to tune the flow velocity of the leakage emissions (F3) and thus get as close as possible to a net-zero velocity between the flow velocity of the leakage emissions (F3) and the second emissions (F2). Further, the use of the segments allows for a uniform circumferential distribution of the leakage emissions (F3) within the integral hood 430, thus resulting in improved noise-attenuation properties of the integral hood 430 when compared to the vehicle exhaust system 200, 300.

Figure 9:
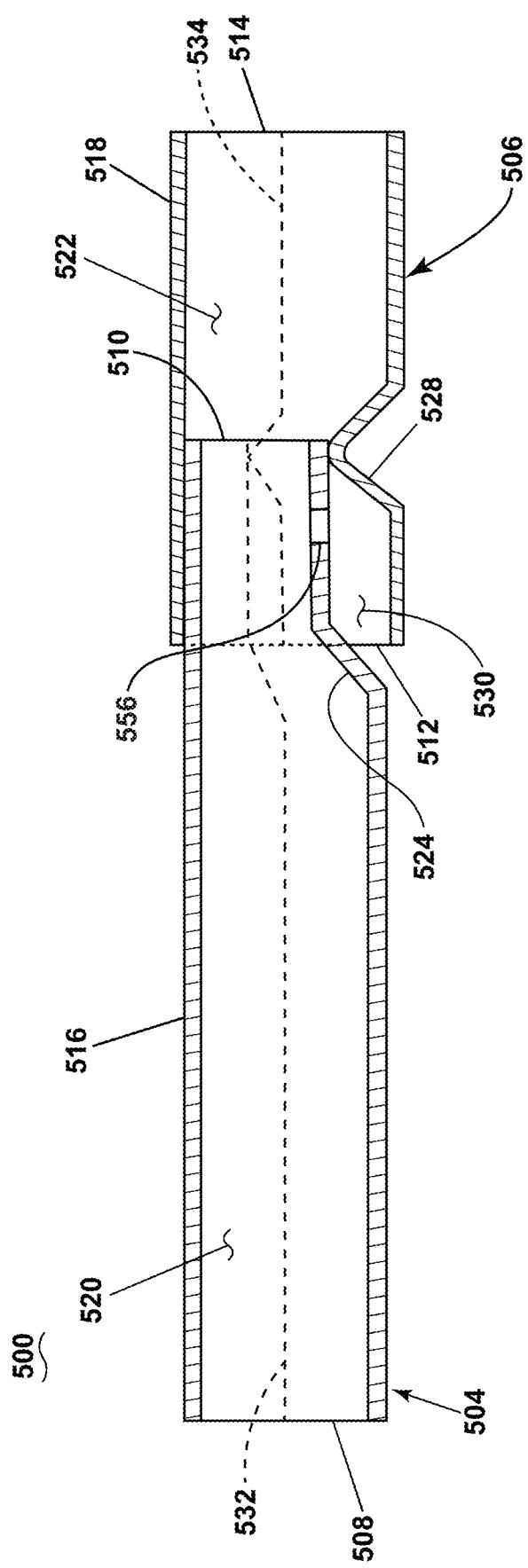
FIG. 9 is a schematic cross-sectional side view of a portion of an exemplary vehicle exhaust system suitable for use within the vehicle exhaust system of FIG. 2, and further including an integral hood with an inlet formed within a first pipe of the vehicle exhaust system.

FIG. 9 is a schematic cross-sectional side view of a portion of an exemplary vehicle exhaust system 500 suitable for use as the vehicle exhaust system 200 of FIG. 2. The vehicle exhaust system 500 is similar to the vehicle exhaust system 200, 300, 400; therefore, like parts will be identified by like numerals increased to the 500 series with it being understood that the description of the vehicle exhaust system 200, 300, 400 applies to the vehicle exhaust system 500, unless otherwise noted.

The vehicle exhaust system 500 includes a first pipe 504 and a second pipe 506. The first pipe 504 includes a first wall 516 defining a first fluid passage 520. The first pipe 504 extends along a first centerline 532 between a first end 508 and a second end 510. The first pipe 504 includes a first step 524. The second pipe 506 includes a second wall 518 defining a second fluid passage 522. The second pipe 506 extends along a second centerline 534 between a third end 512 and a fourth end 514. The second pipe 506 includes a second step 528. An integral hood 530 is formed between the first pipe 504 and the second pipe 506.

The vehicle exhaust system 500 is similar to the vehicle exhaust system 200, 300 in that it includes the first step 524 on the first pipe 504 and the second step 528 on the second pipe 506. The first pipe 504, however, extends axially past the second step 528 such that the second end 310 is axially downstream of an apex of the second step 528. The apex, as used herein, is defined as the radially closest portion of the second step 528 to the second centerline 534. While the second step 528 is illustrated as a constriction (e.g., the third step 228 of FIG. 3), it will be appreciated that the second step 528 can take any suitable form such as the third step 328 (FIG. 6).

An inlet 556 to the integral hood 530 or otherwise to the secondary exhaust passage is formed within a portion of the first pipe 504 that forms a portion of the integral hood 530. While illustrated as single inlet 556, it will be appreciated that the first pipe 504 can include any number of one or more inlets 556 between the second end 510 and the third end 512.

During operation of the vehicle exhaust system 500, at least a portion of the emissions within the first pipe 504 can flow through the inlet 556 and into the integral hood 530.

Benefits of the present disclosure include a vehicle exhaust system with a lower burden of manufacture when compared to a conventional vehicle exhaust system. For example, the conventional vehicle exhaust system can include a hood that receives a leakage emissions. However, the hood is not integrally formed and must be coupled to a respective portion of the vehicle exhaust system. The vehicle exhaust system, as described herein, however, includes the integral hood that does not need to be coupled to the vehicle exhaust system, thus reducing the burden of manufacture when compared to the conventional vehicle exhaust system.

To the extent not already described, the different features and structures of the various aspects can be used in combination with each other as desired. That one feature cannot be illustrated in all of the aspects is not meant to be construed that it cannot be, but is done for brevity of description. Thus, the various features of the different aspects can be mixed and matched as desired to form new aspects, whether or not the new aspects are expressly described. Combinations or permutations of features described herein are covered by this disclosure.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A vehicle exhaust system comprising:
   a first pipe having a first wall defining a first fluid passage, the first pipe extending between a first end and a second end along a first centerline, the first pipe having a first cross-sectional area;
   a second pipe having a second wall defining a second fluid passage, the second pipe extending between a third end and a fourth end along a second centerline, and the second pipe having:
      a second cross-sectional area with a first area at the third end and a second area, smaller than the first area, downstream the first area; and
      a first step defining a transition between the first area and the second area; and
   an integral hood formed between the second end and the third end, the integral hood defined by at least one radial space between the first pipe and the second pipe, with respect to the second centerline;
   wherein at least a portion of the first pipe is positioned within the second pipe such that the third end is provided axially forward of the second end, with respect to the first centerline, and the second end confronts and is spaced from a respective portion of the first step to define a gap therebetween that is fluidly coupled to the integral hood; and wherein the gap defines an opening to the integral hood, and the gap and the integral hood, together, define a secondary emissions passage in which an emissions flows into and out of during operation of the vehicle exhaust system.

2. The vehicle exhaust system of claim 1, wherein the integral hood extends circumferentially about the second centerline a total distance that is less than an entirety of the second centerline.

3. The vehicle exhaust system of claim 2, wherein the integral hood extends continuously or non-continuously circumferentially about a respective portion of the second centerline.

4. The vehicle exhaust system of claim 3, wherein the second pipe includes a first radial half and a second radial half, with respect to the second centerline, with the integral hood being provided entirely on the second radial half.

5. The vehicle exhaust system of claim 4, wherein the second radial half is a gravitationally lower half.

6. The vehicle exhaust system of claim 1, wherein the first step at least partially defines a constriction formed within the second pipe that defines a reduction of the second cross-sectional area and subsequent expansion of the second cross-sectional area.

7. The vehicle exhaust system of claim 1, wherein the first cross-sectional area includes a second step defining a transition between a first area upstream of the second step and a second area, smaller than the first area, downstream the second step.

8. The vehicle exhaust system of claim 7, wherein the second step axially overlies the third end of the second pipe.

9. The vehicle exhaust system of claim 1, wherein the first centerline at the second end is aligned with the second centerline at the second end.

10. A vehicle exhaust system comprising:
  a first pipe having a first wall defining a first fluid passage, the first pipe extending between a first end and a second end along a first centerline, the first pipe having a first cross-sectional area;
  a second pipe having a second wall defining a second fluid passage, the second pipe extending between a third end and a fourth end along a second centerline, and the second pipe having:
    a second cross-sectional area with a first area at the third end and a second area, smaller than the first area, downstream the first area; and
    a first step defining a transition between the first area and the second area; and
  an integral hood formed between the second end and the third end, the integral hood defined by at least one radial space between the first pipe and the second pipe, with respect to the second centerline;
  wherein at least a portion of the first pipe is positioned within the second pipe such that the third end is provided axially forward of the second end, with respect to the first centerline, and the second end confronts and is spaced from a respective portion of the first step to define a gap therebetween that is fluidly coupled to the integral hood;
  wherein the first cross-sectional area includes a second step defining a transition between a first area upstream of the second step and a second area, smaller than the first area, downstream the second step; and
  wherein the second step terminates at the second end.

11. A vehicle exhaust system comprising:
  a first pipe having a first wall defining a first fluid passage, the first pipe extending between a first end and a second end along a first centerline, the first pipe having a first cross-sectional area;
  a second pipe having a second wall defining a second fluid passage, the second pipe extending between a third end and a fourth end along a second centerline, and the second pipe having:
    a second cross-sectional area with a first area at the third end and a second area, smaller than the first area, downstream the first area; and
    a first step defining a transition between the first area and the second area; and
  an integral hood formed between the second end and the third end, the integral hood defined by at least one radial space between the first pipe and the second pipe, with respect to the second centerline, with an inlet to the integral hood being formed along a portion of the first pipe confronting the integral hood, the inlet and the integral hood defining a secondary emissions passage of the vehicle exhaust system, the integral hood at the inlet extends circumferentially about less than an entire circumference of the second centerline at the inlet;
  wherein at least a portion of the first pipe is positioned within the second pipe such that the third end is provided axially forward of the second end, with respect to the first centerline, and the second end is spaced axially aft of an apex of the first step.

12. The vehicle exhaust system of claim 11, wherein an emissions from the vehicle exhaust system flows into and out of the secondary emissions passage during operation of the vehicle exhaust system.

13. The vehicle exhaust system of claim 11, wherein the integral hood extends circumferentially about the second centerline a total distance that is less than an entirety of the second centerline.

14. The vehicle exhaust system of claim 13, wherein the integral hood extends continuously or non-continuously circumferentially about a respective portion of the second centerline.

15. The vehicle exhaust system of claim 14, wherein the second pipe includes a first radial half and a second radial half, with respect to the second centerline, with the integral hood being provided entirely on the second radial half.

16. The vehicle exhaust system of claim 11, wherein the first step at least partially defines a constriction formed within the second pipe that defines a reduction of the second cross-sectional area and subsequent expansion of the second cross-sectional area.

17. The vehicle exhaust system of claim 11, wherein the first cross-sectional area includes a second step defining a transition between a first area upstream of the second step and a second area, smaller than the first area, downstream the second step.

18. The vehicle exhaust system of claim 17, wherein the second step terminates at the second end.

19. The vehicle exhaust system of claim 17, wherein the second step axially overlies the third end of the second pipe.

* * * * *